(12) United States Patent
Tanaka et al.

(10) Patent No.: US 9,310,567 B2
(45) Date of Patent: Apr. 12, 2016

(54) OPTICAL CONNECTOR

(71) Applicant: OLYMPUS CORPORATION, Tokyo (JP)

(72) Inventors: Yoshinori Tanaka, Hino (JP); Satoshi Ohara, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/567,726

(22) Filed: Dec. 11, 2014

(65) Prior Publication Data

US 2015/0093076 A1 Apr. 2, 2015

Related U.S. Application Data

(63) Continuation of application No. PCT/JP2013/066259, filed on Jun. 12, 2013.

(30) Foreign Application Priority Data

Jun. 18, 2012 (JP) .................................. 2012-137186

(51) Int. Cl.
*G02B 6/38* (2006.01)

(52) U.S. Cl.
CPC .............. *G02B 6/3814* (2013.01); *G02B 6/389* (2013.01); *G02B 6/3849* (2013.01)

(58) Field of Classification Search
CPC .. G02B 6/3885; G02B 6/3878; G02B 6/3869; G02B 6/3821; G02B 6/3825; G02B 6/3893
USPC ...................................................... 385/59–60
See application file for complete search history.

(56) References Cited

U.S. PATENT DOCUMENTS

| 5,940,560 A | 8/1999 | De Marchi et al. |
| 6,352,375 B1 | 3/2002 | Shimoji et al. |

(Continued)

FOREIGN PATENT DOCUMENTS

| CN | 1955773 A | 5/2007 |
| CN | 101105556 A | 1/2008 |

(Continued)

OTHER PUBLICATIONS

International Search Report dated Jul. 9, 2013 issued in PCT/JP2013/066259.

(Continued)

*Primary Examiner* — Ellen Kim
(74) *Attorney, Agent, or Firm* — Scully, Scott, Murphy & Presser, PC (57) ABSTRACT

An optical connector includes a first engaging member holding at least one first optical fiber to guide light from a light source, a second engaging member holding a second optical fiber to be optically connected to the first optical fiber, and configured to be engaged with the first engaging member, and a light shield member provided near an emission end of the first optical fiber, at such a position as to shield light from the first optical fiber at disengagement of the engaging members. The light shield member is pushed by the second engaging member at engagement of the engaging members, so as to be folded and evacuated in a gap. The light shield member includes a light absorption member to absorb light and to generate heat, a thermal diffusion member to diffuse and radiate the heat, and a base supporting the light absorption member and thermal diffusion member.

11 Claims, 8 Drawing Sheets

(56) References Cited

U.S. PATENT DOCUMENTS

| | | | |
|---|---|---|---|
| 8,186,890 B2 * | 5/2012 | Lu | G02B 6/3807 385/139 |
| 2004/0052473 A1 | 3/2004 | Seo et al. | |
| 2007/0098330 A1 | 5/2007 | Ozawa et al. | |
| 2008/0013148 A1 | 1/2008 | Katagiyama et al. | |

FOREIGN PATENT DOCUMENTS

| | | |
|---|---|---|
| EP | 0 788 002 A1 | 8/1997 |
| EP | 0 838 702 A1 | 4/1998 |
| JP | 9211264 A | 8/1997 |
| JP | 2002243978 A | 8/2002 |
| JP | 200494109 A | 3/2004 |
| WO | 2009/103174 A1 | 8/2009 |

OTHER PUBLICATIONS

English translation of International Preliminary Report on Patentability together with the Written Opinion dated Dec. 31, 2014 received in related International Application No. PCT/JP2013/066259.

Chinese Office Action dated Jul. 16, 2015 from related Chinese Patent Application No. 201380026134.4, together with an English language translation.

Extended Supplementary European Search Report dated Feb. 2, 2016 from related European Application No. 13 80 6975.2.

* cited by examiner

OPTICAL CONNECTOR

CROSS-REFERENCE TO RELATED APPLICATIONS

This application is a Continuation Application of PCT Application No. PCT/JP2013/066259, filed Jun. 12, 2013 and based upon and claiming the benefit of priority from Japanese Patent Application No. 2012-137186, filed Jun. 18, 2012, the entire contents of all of which are incorporated herein by reference.

BACKGROUND OF THE INVENTION

1. Field of the Invention

The present invention relates to an optical connector which comprises first and second engaging members that are attached to distal ends of optical fibers, respectively, and are mutually engaged, and relates, in particular, to an optical connector including a shield member for preventing external radiation of light from an opening of the engaging member on a light source side when the engaging members are engaged or disengaged.

2. Description of the Related Art

Jpn. Pat. Appln. KOKAI Publication No. H9-211264 discloses an optical connector which comprises an adapter functioning as a first engaging member provided at a distal end of an optical fiber to guide light from a light source, and a plug functioning as a second engaging member which is similarly provided at a distal end of an optical fiber and is engaged with the adapter. In the adapter of this optical connector, a shutter plate, which is a light shield member, is disposed at an opening portion in which the plug is engaged.

The shutter plate is obliquely provided in a direction from the opening portion side toward an emission end side of the optical fiber, and is disposed so as to shield light which is emitted from the emission side of the optical fiber. If the plug is inserted into the opening portion, the shutter plate is pushed by the plug along an oblique surface from the back surface side, is folded, and is evacuated in a gap provided in advance. Thereby, an optical fiber emission end of the adapter and an optical fiber incidence end of the plug are optically coupled. In addition, if an operation for pulling out the plug is performed, the shutter plate behaves in a manner reverse to the above, and finally stands up by resiliency and can restore to the original state for shielding light. Thereby, when the plug has been unintentionally pulled out or when the plug is inserted, no light is radiated from the opening portion of the adapter even if the light source is turned on.

In the meantime, in the structure of Jpn. Pat. Appln. KOKAI Publication No. H9-211264, light radiated on the shutter plate is irregularly reflected. If the adapter-side optical fiber is guiding intense light, part of the reflected intense light is radiated on, for example, a structural member of the adapter, and this radiated structural member is heated. It is possible that the heated structural member is melted and, as a result, at least a part of the housing is deformed and the adapter and plug cannot be engaged once again. In this manner, in some cases, the adapter may be damaged by light radiated on the light shield member, and the purpose of use would be limited.

BRIEF SUMMARY OF THE INVENTION

The object of the invention is to provide an optical connector which is free from fear of damage due to the influence of light radiated on a light shield member, even in the purpose of use for guiding intense light.

An optical connector includes a first engaging member holding at least one first optical fiber to guide light from a light source, a second engaging member holding a second optical fiber to be optically connected to the first optical fiber, and configured to be engaged with the first engaging member, and a light shield member provided in a vicinity of an emission end of the first optical fiber of the first engaging member, at such a position as to shield radiation light emitted from the first optical fiber toward an outside at a time of disengagement of the first and second engaging members. The light shield member is pushed by the second engaging member at a time of engagement of the first and second engaging members, so as to be folded and evacuated in a gap provided in advance from an optical path of the radiation light. The light shield member includes a light absorption member configured to receive and absorb the radiation light and to generate heat, a thermal diffusion member configured to diffuse and radiate the heat generated by the light absorption member, and a base supporting the light absorption member and the thermal diffusion member.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described in detail with reference to the accompanying drawings.

First Embodiment

Figure 1A:
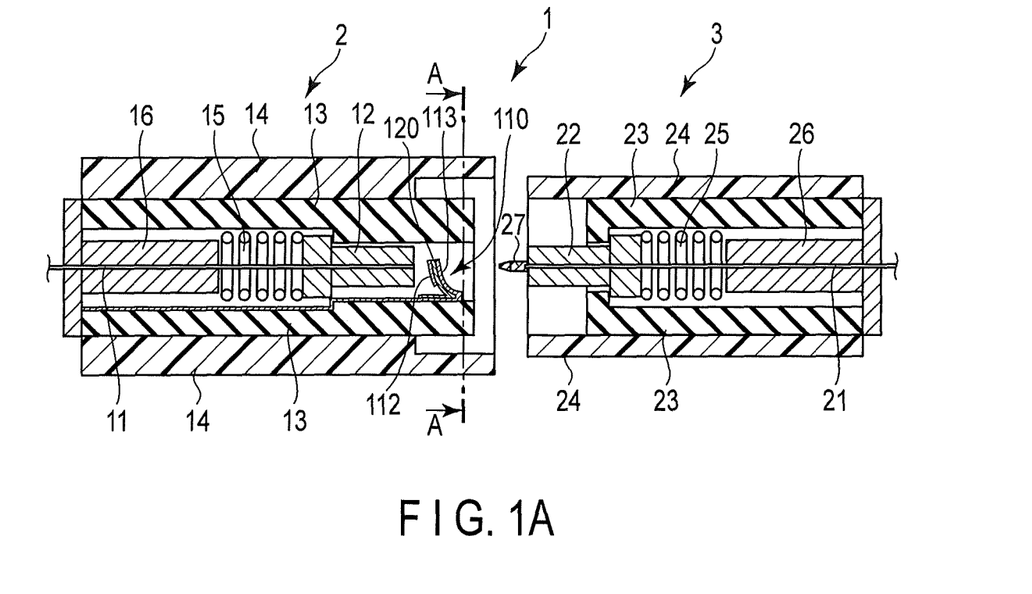
FIG. 1A is a longitudinal cross-sectional view of an optical connector according to a first embodiment.
Figure 1B:
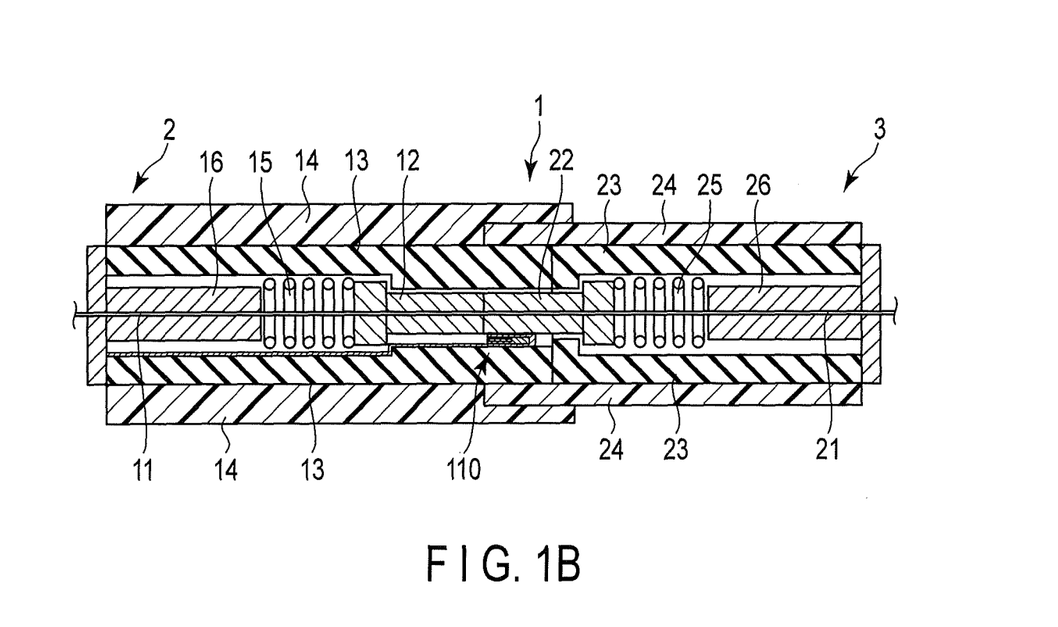
FIG. 1B is a longitudinal cross-sectional view of the optical connector in the engaged state.

As illustrated in FIG. 1A and FIG. 1B, an optical connector 1 comprises an adapter 2, which is a first engaging member, and a plug 3, which is a second engaging member, the adapter 2 and plug 3 having mutually engaging shapes and being detachably attached. In the description below, an optical fiber distal end in the adapter 2 from which light is emitted is referred to as an emission end, and an optical fiber distal end in the plug 3 on which light emitted from the adapter 2 impinges is referred to as an incidence end. In addition, in the adapter 2 and plug 3, an end portion on a side from which a cable, which is attached to a light source or a device, extends is referred to as a proximal end portion. Furthermore, in the adapter 2 and plug 3, a portion, which opens at a time of disengagement, is referred to as an opening portion.

The adapter 2 and plug 3 include a first insulator portion 13 and a second insulator portion 23, which are disposed in a recess-and-projection relationship, and are abutted upon and coupled to each other.

Figure 1C:
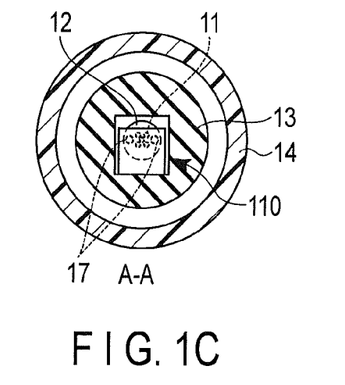
FIG. 1C is a cross-sectional view taken along a line A-A in FIG. 1A.

The adapter 2 has, for example, a circular cross-sectional shape in a cross section A-A perpendicular to an optical axis, as illustrated in FIG. 1C. For example, the plug 3 similarly has a circular cross-sectional shape. In the plug 3, a housing 24 has such a diameter as to be fitted in the inside of the housing of the adapter 2. Incidentally, although the cross-sectional shapes of the emission end portion of the adapter 2 and the incidence end portion of the plug 3 in this embodiment are circular, these cross-sectional shapes are not limited and may be, for example, rectangular or polygonal.

As illustrated in a left side of FIG. 1A, the adapter 2 includes a first optical fiber 11 which is an optical component penetrating in a longitudinal direction and configured to guide light from a light source; a first ferrule 12 holding the first optical fiber 11; a hole 17 which is formed in an abutment surface of the first ferrule in order to align the optical fiber at a time of engagement; the first insulator portion 13 in which a communication hole is formed; a housing 14 which is an outer sheath member in which the first insulator portion 13 is inserted; a first spring portion 15 which is urging means configured to urge the first ferrule 12 so that the first ferrule 12 may not retreat to the proximal end side at a time of engagement; a first pushing portion 16 configured to push the spring portion 15 toward the emission end at a time of engagement; and a light shield member 110 which is disposed in a region closer to the emission end than the first optical fiber 11 and shields light.

The first insulator portion 13 contains the first ferrule 12, first spring portion 15, and first pushing portion 16 within the hole penetrating in the longitudinal direction. The first ferrule 12 is formed in a cylindrical shape, and that part of the first ferrule 12 on the proximal end side which is in contact with the first spring portion 15 is formed to have a large diameter and have a protruding shape like a flange and is configured to abut on a stepped portion formed on the first insulator portion 13 so as not to be displaced to the outside even when urged by the first spring portion 15.

Similarly, as illustrated in a right side of FIG. 1A, the plug 3 includes a second optical fiber 21 penetrating in the longitudinal direction; a second ferrule 22 holding the second optical fiber; the second insulator portion 23 in which a communication hole is formed; a second housing 24 which is formed to be engaged with the adapter 2; a second spring portion 25 which is urging means configured to urge the second ferrule 22 toward the incidence end; a second pushing portion 26 configured to push the spring portion 25 toward the incidence end at a time of engagement; and a guide pin 27 which is an alignment member that is to be engaged in the hole 17 formed in the first ferrule 12 of the adapter 2.

The second insulator portion 23 contains the second ferrule 22, second spring portion 25, and second pushing portion 26 within the penetrating hole. The second ferrule 22 is also formed in a cylindrical shape, and that part of the second ferrule 22 on the proximal end side which is in contact with the second spring portion 25 is formed to have a large diameter and have a protruding shape like a flange and is configured to abut on a stepped portion formed on the second insulator portion 23 so as not to be displaced to the outside even when urged by the second spring portion 25. Incidentally, although the first and second ferrules 12, 22 are illustrated like a single-core structure, the first and second ferrules 12, 22 are not limited to this and may have a multi-core structure as illustrated in FIG. 1C, which holds a plurality of optical fibers.

As illustrated in FIG. 1B, the adapter 2 and plug 3 are formed such that when the adapter 2 and plug 3 are engaged, the emission end of the first optical fiber 11 and the incidence end of the second optical fiber 21 abut upon each other or come close to each other and are optically coupled on the optical axis. When the first and second optical fibers are optically coupled, light guided from the light source (not shown) is guided from the first optical fiber 11 to the second optical fiber 21 without loss. When this engagement is released, light is radiated to the outside from the emission end of the first optical fiber. The guided light is, for example, coherent light such as a laser beam, or high-intensity light such as incoherent light.

As illustrated in FIG. 1C, the first ferrule 12 holds the first optical fiber 11 such that the first optical fiber 11 passes through the communication hole, and the holes 17 are disposed at positions opposed to the guide pins 27 on both sides near this communication hole. In addition, a distal end portion of the first ferrule 12 is formed such that no connection loss occurs due to optical coupling, and is subjected to, for example, PC (Physical contact) polishing (not illustrated).

Similarly, the second ferrule 22 holds the second optical fiber 21 such that the second optical fiber 21 passes through the communication hole, and the guide pins 27 are formed such that distal ends thereof project from the abutment surface of the second ferrule 22, so that the guide pins 27 are fitted in the holes 17. In addition, like the first ferrule 12, a distal end portion of the second ferrule 22 is formed such that no connection loss occurs due to optical coupling (not illustrated).

In order to specify the engagement position at a time when the adapter 2 and plug 3 are engaged, the guide pins 27 are opposed to the holes 17 and disposed near the emission end. In addition, the guide pins 27 are disposed so as to come in contact with the light shield member 110 when the adapter 2 and plug 3 are engaged, and to fold the light shield member 110 from the emission end side to the proximal end side.

The shape of the first and second ferrules 12, 22 in this embodiment is not limited to the cylindrical shape, and, for example, the cross-sectional shape may be a rectangular prism shape, a polygonal prism shape, or a combination of a cylindrical shape and these shapes. The first and second ferrules 12, 22 are formed of, for example, nickel, zirconia, or brass. Similarly, the shape of the first and second insulator portions 13, 23 is not limited to the cylindrical shape, and, for example, the cross-sectional shape may be a rectangular prism shape, a polygonal prism shape, or a combination of a cylindrical shape and these shapes. The first and second insulator portions 13, 23 are formed of, for example, an insulator such as rubber or resin.

The first and second pushing portions 16, 26 are fitted and fixed in the first and second insulator portions 13, 23 from the proximal end side, and are provided such that the distal end portions thereof come in contact with the first and second spring portions 15, 25 or push the first and second spring portions 15, 25 in a direction of compression.

Next, the light shield member 110 is described.

As illustrated in FIG. 1B, the light shield member 110 is provided near the first ferrule 12 in the inside of the vicinity of the emission end of the first insulator portion 13. The light shield member 110 is formed to be retractable. The light shield member 110 is disposed such that when the adapter 2 and plug 3 are engaged, the light shield member 110 is pushed down by the guide pins 27 and a part of the lower portion of the ferrule 22, and the light shield member 110 can be retracted in the folded state in a gap provided between the ferrule 22 and the first insulator portion 13. In addition, the light shield member 110 is disposed in a plane and a position opposed to at least the optical fiber 11 and holes 17.

Figure 1D:
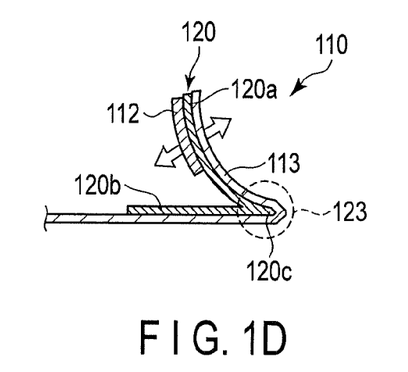
FIG. 1D is a schematic view of a light shield member provided in the optical connector.

As illustrated in FIG. 1D, the light shield member 110 includes a light absorption member 112 comprising a light absorption film having a surface to absorb light radiated from the first optical fiber 11; a thermal diffusion member 113 to radiate and diffuse heat that is generated by the light absorption member 112; and a shutter base 120 supporting the light absorption member 112 and thermal diffusion member 113.

As illustrated in FIG. 1A and FIG. 1C, the light shield member 110 is disposed such that the light shield member 110 traverses the optical path on the inside of the vicinity of the emission end of the first insulator portion 13, in the state in which the light shield member 110 stands up in order to shield the light radiated from the first optical fiber 11. In addition, as illustrated in FIG. 1B, the light shield member 110 is configured such that when the pushed light shield member 110 is bent, the light shield member 110 may not come in contact with, or cause damage to, the distal end face of the first ferrule 12.

As illustrated in FIG. 1D, the shutter base 120 comprises a shutter light shield member 120a which stands up from a shutter bend portion 120c and is surface-curved (curved); and a shutter fixing member 120b which is flat and is fixed to the first insulator portion 13 by an adhesive or the like. The shutter base 120 is formed in such a substantially L shape that the shutter light shield member 120a and shutter fixing member 120b are coupled at the shutter bend portion. The shutter base 120 is, for example, a plate spring having such a shape that a metallic plate of stainless steel or the like is bent. In this case, the shutter light shield member 120a has an incidence surface which is provided with the light absorption member 112 opposed to the emission end of the first optical fiber 11, and a heat radiation surface on the back side (non-light-radiation surface) of this incidence surface, that is, a surface on which the thermal diffusion member 113 is disposed, as viewed from the opening of the adapter 2 at a time of disengagement. The shutter bend portion 120c is formed to have an R of a certain radius such that stress does not concentrate when the shutter base 120 is pushed and folded by the guide pins 27.

The light absorption member 112 is a member to absorb light, for example, a light absorption film with a high light absorbance, which is formed such that alumite-processed aluminum, for instance, is formed in a thin plate or sheet shape. In addition, the light absorption member 112 has, for example, a high heat conductivity. As illustrated in FIG. 1D, the light absorption member 112 is provided in a range including at least that area on the incidence surface of the shutter light shield member 120a on which light is radiated. In a fabrication method thereof, for example, a film of aluminum may be formed on the shutter base 120 by an evaporation method, an electrolytic plating method, or a sputtering method, and an alumite process may be performed. Alternatively, an alumite-processed aluminum thin plate may be glued.

The thermal diffusion member 113 is a strip-shaped member which is formed on the heat radiation side of the shutter base 120 in order to radiate and diffuse heat generated by the light absorption member 112. The thermal diffusion member 113 is formed of, for example, graphite. The thermal diffusion member 113 in this embodiment is provided such that the thermal diffusion member 113 extends from the heat radiation surface of the shutter base 120 onto the bottom surface of the shutter fixing member 120b, and extends along the inner wall to the proximal end side in rear of the first insulator portion 13. For example, the thermal diffusion member 113 is glued by an adhesive or the like, and disposed, over the entirety of the bottom surface of the hole of the first insulator portion 13. Incidentally, the thermal diffusion member 113 may not be disposed on the inner wall of the hole of the first insulator portion 13, but may be disposed at a position where the thermal diffusion member 113 can be disposed in the inside of the adapter 2 and plug 3 from the light shield member 110.

When the adapter 2 and plug 3 are released and disengaged, the light shield member 110 shields light radiated from the distal end of the first optical fiber, by the light absorption member 112 of the standing-up shutter base 120, and prevents direct radiation to the outside. At this time, the light absorption member 112 absorbs incident light so that the light may not be reflected, and generates heat. The generated heat is conveyed through the shutter base 120 and is radiated by the thermal diffusion member 113.

According to the present embodiment, when the adapter 2 and plug 3 are engaged, the light shield member 110 is folded and evacuated from the optical path. When the adapter 2 and plug 3 are disengaged, the light absorption member 112 stands up and moves back onto the optical path, thereby shielding light radiated to the outside.

Furthermore, the light absorption member 112 of the light shield member 110 can absorb received light without reflecting the light. Accordingly, it is possible to prevent damage due to thermal deformation or melting of the structural members of the adapter 2 by the radiation of reflective light. In addition, since the shutter bend portion 120c of the light shield member 110 is formed so as not to cause stress concentration, the shutter bend portion 120c has durability to repeated bending.

Moreover, since the guide pins 27 project from the distal end of the second ferrule 22 and fold the light shield member 110, it is possible to prevent damage to the distal end face of the second optical fiber 21. In addition, by the guide of the guide pins 27 and holes 17, the distal ends of the first optical fiber 11 and second optical fiber 21 are optically coupled without misalignment, and the first and second housings 14, 24 are engaged as designed.

Besides, the hole of the first insulator portion 13 is formed such that the cross section from the opening end of the adapter 2 to a predetermined position has a rectangular prism shape. Thus, the light shield member 110, which is fixed to the shutter fixing member 120b, is uniformly pushed, and can be properly folded without being flexed sideward. By providing the gap between the outer periphery of the first ferrule 12 and the inside of the first insulator portion 13, the light shield member 110 can be bent and contained in this gap.

In addition, when the plug 3 is disengaged from the adapter 2, the shutter base 120 of the light shield member 110 stands up onto the optical path by the urging force of the plate spring structure, and can be restored to such a position as to shield the light of the optical path.

Modification of First Embodiment

Figure 2A:
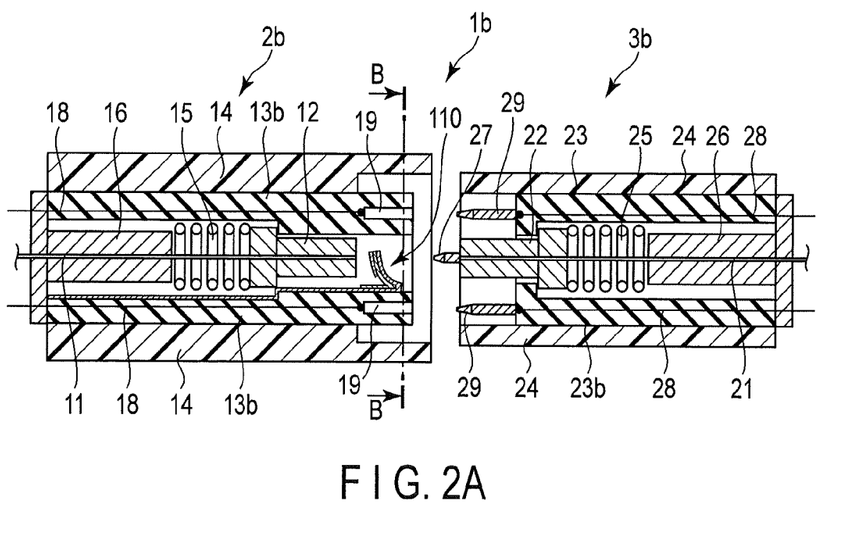
FIG. 2A is a longitudinal cross-sectional view of an optical connector according to a modification of the first embodiment.
Figure 2B:
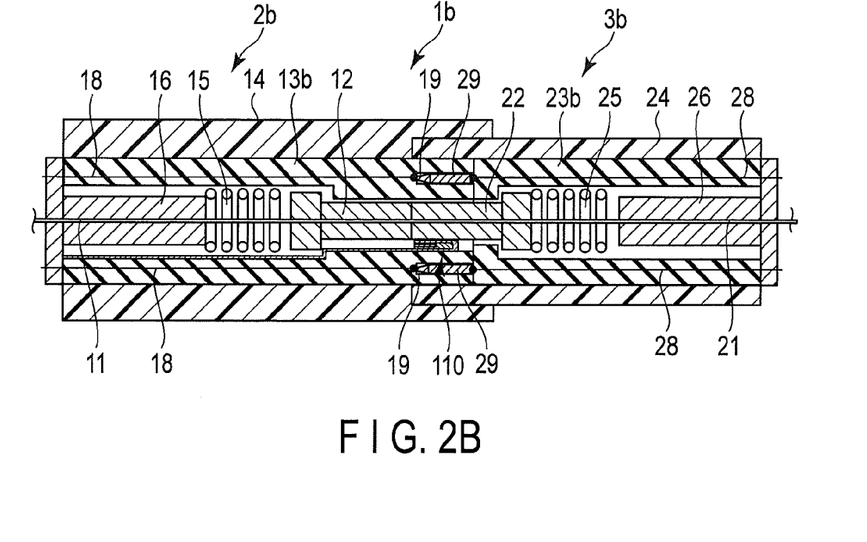
FIG. 2B is a longitudinal cross-sectional view of the optical connector of the modification in the engaged state.

Next, a modification of the first embodiment is described. As illustrated in FIG. 2A and FIG. 2B, an optical connector 1b of the modification of the first embodiment has substantially the same structure as the optical connector 1 of the first embodiment, but these are different with respect to the structure in which wiring lines and electric pins are provided in the insulator portions. In the modification to be described below, the same structural elements as in the above-described first embodiment are denoted by like reference numerals, and a detailed description thereof is omitted.

In the modification of the first embodiment, an adapter 2b and a plug 3b have substantially the same structures as the adapter 2 and plug 3 of the first embodiment, respectively, but first and second insulator portions 13b, 23b are configured to further include electrical structural elements, and the modification has a different structure which is a so-called photoelectric composite connector 1. In the modification of the first embodiment, the optical connector is referred to as the photoelectric composite connector 1b.

Figure 2C:
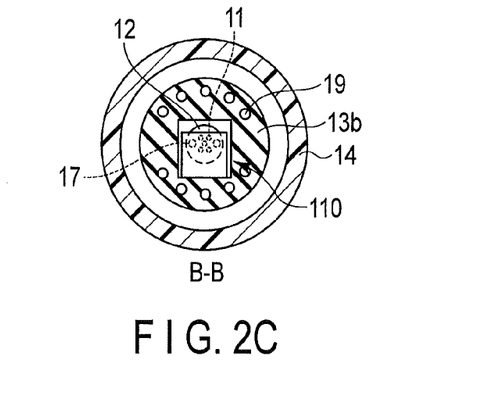
FIG. 2C is a cross-sectional view taken along a line B-B in FIG. 2A.

As illustrated in FIG. 2A and FIG. 2C, in addition to the structural elements of the first insulator portion 13, the first insulator portion 13b includes at least one hole 19, a contact point portion provided at a bottom portion in the hole 19, and a first wiring line 18 which is provided so as to penetrate from this contact point portion to the proximal end portion side through the first insulator portion 13b. Besides, in addition to the structural elements of the second insulator portion 23, the second insulator portion 23b includes an electric pin 29 with electrical conductivity which is protruded so as to be engaged in each hole 19, and a second wiring line 28 which is provided so as to penetrate from the rear end of each electric pin 29 to the proximal end portion side through the second insulator portion 23b. As illustrated in FIG. 2B, at a time of engagement of the photoelectric composite connector 1b, the electric pins 29 are inserted in the holes 19, the distal ends of the pins come in contact with the contact point portions provided at the bottom portions of the holes 19, and the first wiring lines 18 and second wiring lines are electrically connected.

According to the modification of the first embodiment, when the adapter 2b and plug 3b are engaged, since the electric pins 29 are engaged in the holes 19, the electric pins 29 can also be used, like the guide pins 27, in order to align the first and second optical fibers. In addition, since desired signals can be transmitted by the electrical connection between the first wiring lines 18 and second wiring lines 28, video signals can be transmitted to, for example, a device (not shown) disposed at a distal end of a cable connected to the proximal end portion of the plug 3b, for instance, a camera such as a CCD, and control signals and power can be sent to other driving modules. Thus, the provision of cables can be simplified by integrating signal cables and power cables, which have been separately needed, with the connector and/or cables. Furthermore, as regards each cable connection, since cables can be connected comprehensively along with the engagement between the adapter 2 and plug 3, it is possible to prevent forgetting to connect cables, and preparations and putting in order become easy, and a work load is reduced. Moreover, since the optical structural elements and electrical structural elements are disposed in one connector, the elements of the structural members can be reduced. As a result, the photoelectric composite connector is reduced in diameter.

Second Embodiment

Figure 3:
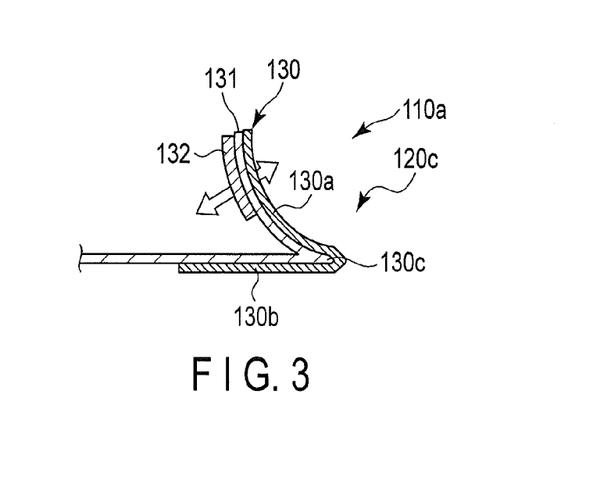
FIG. 3 is a schematic view of a light shield member of a second embodiment.

Next, referring to FIG. 3, a second embodiment is described.

A light shield member 110a of this embodiment has substantially the same structure as the light shield member 110 of the first embodiment, but these are different in that a thermal diffusion member 131 and a light absorption member 132 are configured to be directly glued. In the description below, the same structural elements as in the first embodiment are denoted by like reference numerals, and a detailed description thereof is omitted.

As illustrated in FIG. 3, the light shield member 110a includes, at least, a shutter base 130, the light absorption member 132 and thermal diffusion member 131. The shutter base 130 includes a shutter light shield member 130a, a shutter fixing member 130b, and a shutter bend portion 130c. Incidentally, in this embodiment, although the shutter light shield member 130a and shutter fixing member 130b comprise a single plate member, the shutter light shield member 130a and shutter fixing member 130b may be separate bodies, if these are coupled by the shutter bend portion 130c.

As shown in FIG. 3, the thermal diffusion member 131 is glued and provided along that surface side of the shutter base 130 on which light is radiated. The thermal diffusion member 131 extends via the shutter fixing member 130b toward the proximal end portion side of the adapter 2, as illustrated in FIG. 1D, and is disposed over a wide range of the inner wall of the first insulator portion 13. Further, the light absorption member 132 is provided on the thermal diffusion member 131 on the surface side on which light is radiated. The light absorption member 132 is disposed in a range including at least that area of the thermal diffusion member 131 on which light is radiated.

The shutter base 130 has substantially the same structure as the shutter base 120 of the first embodiment, but these are different with respect to the structure in which the shutter fixing member 130b is fixed to the inner wall of the hole of the first insulator portion 13.

The advantageous effects of the present embodiment are described.

According to the optical connector of this embodiment, since the light absorption member 132 and thermal diffusion member 131 are put indirect contact, the heat radiation effect is improved. In addition, since the shutter base 130 comes in direct contact with the guide pins 17 and is pushed and folded, it is possible to prevent damage to the surface of the thermal diffusion member 131 due to contact.

First Modification of Second Embodiment

Figure 4A:
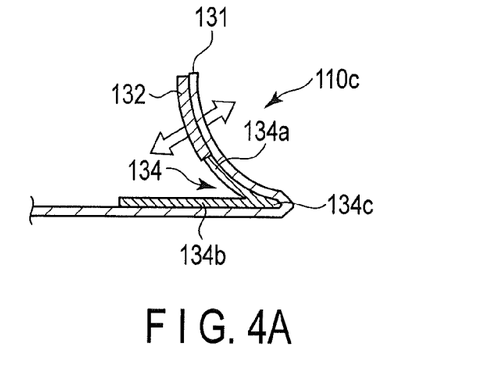
FIG. 4A is a schematic view of a light shield member of a first modification of the second embodiment.
Figure 4B:
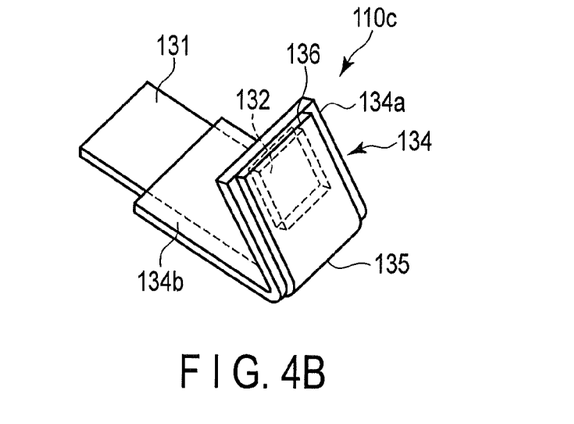
FIG. 4B is a perspective view of the light shield member of the first modification of the second embodiment.

Next, referring to FIG. 4A and FIG. 4B, a first modification of the second embodiment is described.

A light shield member 110c of this embodiment has substantially the same structure as the light shield member 110 of the first embodiment, but these are different with respect to the structure in which the thermal diffusion member 131 and light absorption member 132 are directly glued. In the description below, the same structural elements as in the first embodiment are denoted by like reference numerals, and a detailed description thereof is omitted.

An optical connector of the first modification of this embodiment includes, as the light shield member, the light shield member 110c illustrated in FIG. 4A and FIG. 4B. This light shield member 110c comprises at least a shutter base 134, a light absorption member 132, and a thermal diffusion member 131. The shutter base 134 includes a shutter light shield member 134a with a notch portion, a shutter fixing member 134b, and a shutter bend portion 134c. Incidentally, in this embodiment, although the shutter light shield member 134a and shutter fixing member 134b comprise a single plate member, the shutter light shield member 134a and shutter fixing member 134b may be separate bodies, if these are coupled by the shutter bend portion 134c.

This light shield member 110c is configured such that a notch portion 136 is formed in the shutter light shield member 134a, and the light absorption member 132 is fitted in this notch portion. As illustrated in FIG. 4B, the notch portion 136 has, for example, a rectangular shape. The notch portion 136 has such an area as to have at least the entire area on which radiated light falls.

The thermal diffusion member 131 extends from the back surface (non-light-radiation surface) of the shutter light shield member 134a to the bottom surface of the shutter fixing member 134b in close contact, and is disposed and glued over a wide range of the inner wall of the hole of the first insulator portion 13. In this modification, when the first and second engaging members are engaged, the guide pins 27 are configured to come in contact with the thermal diffusion member 131 and fold the light shield member 110c.

The light shield member 110c receives radiated light by the light absorption member 132, and the generated heat is directly conveyed to the thermal diffusion member 131 which is in close contact with the light absorption member 132, and is diffused and radiated.

According to the first modification of this embodiment, since the light absorption member 132 and thermal diffusion member 131 provided on the shutter light shield member 134a are put in direct contact, the heat radiation effect is improved. Since the fixing position of the light absorption member 132 is determined by the notch portion 136, the assembling work becomes easier.

Second Modification of Second Embodiment

Figure 5A:
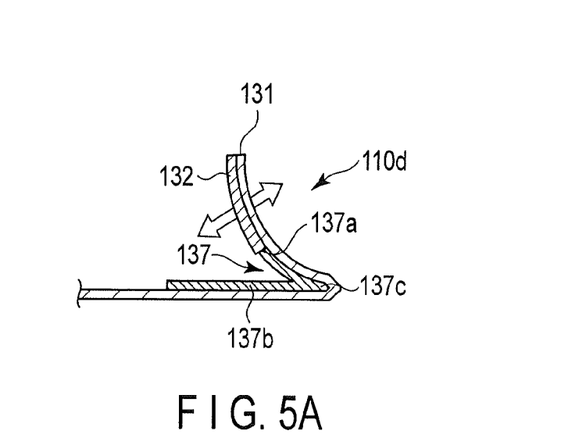
FIG. 5A is a schematic view of a light shield member of a second modification of the second embodiment.
Figure 5B:
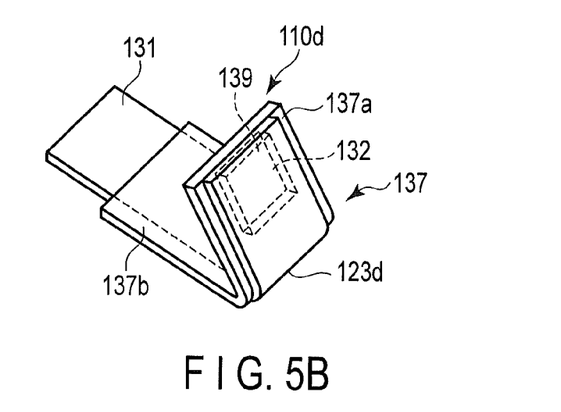
FIG. 5B is a perspective view of the light shield member of the second modification of the second embodiment.

Next, referring to FIG. 5A and FIG. 5B, a second modification of the second embodiment is described.

The second modification of the second embodiment has substantially the same structure as the first modification of this embodiment, but these are different with respect to the structure of a shutter light shield member 137a. Accordingly, the same structural elements as in the first modification of this embodiment are denoted by like reference numerals, and a detailed description thereof is omitted.

A light shield member 110d of the optical connector of this modification includes a shutter base 137. The shutter base 137 comprises the shutter light shield member 137a, a shutter fixing member 137b, and a shutter bend portion 137c. A rectangular hole 139 is opened in the shutter light shield member 137a, and the light absorption member 132 is fitted in this hole 139. This light absorption member 132 is directly in close contact with the thermal diffusion member 131 on the back surface side (non-light-radiation surface). Incidentally, this hole 139 may not be rectangular, and the shape of the hole 139 is not particularly limited and may be circular, elliptic, etc., if the hole 139 has an area including at least the entire area on which radiated light falls. In the meantime, the optical connector of this embodiment may be configured to include at least one electric pin and a hole for engagement with the electric pin, as in the modification of the first embodiment.

According to the second modification of this embodiment, since the hole 139 is opened in the shutter light shield member 137a, a fringe in the shutter light shield member 137a exists and the strength is maintained. Since the thermal diffusion member 131 and light absorption member 132 provided on the shutter light shield member 137a are put in direct contact, the heat radiation effect is improved. Since the fixing position of the light absorption member 132 is determined by the hole 139, the assembling work becomes easier.

Third Embodiment

Figure 6:
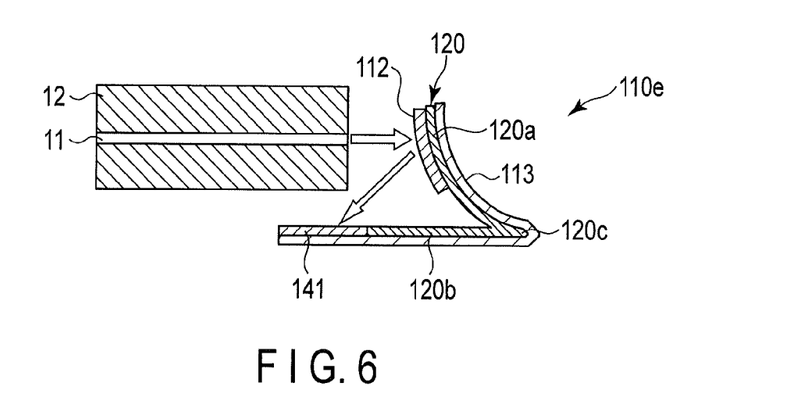
FIG. 6 is a schematic view of a light shield member of a third embodiment.

Next, referring to FIG. 6, a third embodiment is described. An optical connector of the third embodiment is configured such that another light absorption member is provided in addition to the structure of a light shield member which becomes the light shield member to be mounted in the adapter 2. In the description below, the same structural elements as in the first embodiment are denoted by like reference numerals, and a detailed description thereof is omitted.

A light shield member 110e disposed in the adapter 2 of this embodiment includes a shutter base 120, a first light absorption member 112, a second light absorption member 141, and a thermal diffusion member 113. The shutter base 120 comprises a shutter light shield member 120a, a shutter fixing member 120b, and a shutter bend portion 120c.

As illustrated in FIG. 6, the first light absorption member 112 is glued onto the light radiation surface side of the shutter light shield member 120a. In addition, the second light absorption member 141 is disposed on at a position on the thermal diffusion member 113 where part of light (reflective light) of the first optical fiber 11 which fails to be absorbed by the first light absorption member 112 and is reflected impinges. Specifically, the second light absorption member 141 is disposed on the thermal diffusion member 113 on the rear (first optical fiber 11) side of the shutter fixing member 120b. In addition, the first light absorption member 112 has a range including at least the area on which light is radiated, and the second light absorption member 141 has a range including at least the area on which reflective light is radiated.

As shown in FIG. 6, the thermal diffusion member 113 extends from the back surface (non-light-radiation surface) of the shutter light shield member 120a through the bottom surface side in close contact with the shutter bend portion 120c, shutter fixing member 120b and second light absorption member 141, and is disposed and glued over a wide range of the inner wall of the hole of the first insulator portion 13. Incidentally, like the second embodiment or the modification of the second embodiment, the light absorption member 112 may be configured to be directly glued onto the thermal diffusion member 113.

When light is radiated from the first optical fiber 11, the light shield member 110e absorbs the light by the first light absorption member 112, and radiates light which fails to be absorbed by the first light absorption member 112 and is reflected toward the second light absorption member 141. The second light absorption member 141 absorbs reflective light from the first light absorption member 112. The heat generated by the first light absorption member 112 is conveyed to the shutter light shield member 120a, and is radiated, while being diffused, by the thermal diffusion member 113. In addition, the heat generated by the second light absorption member 141 is directly conveyed to the thermal diffusion member 113 and is radiated.

According to the optical connector of the present embodiment, the two, namely first and second, light absorption members 112, 141 are mounted. The light which fails to be absorbed by the first light absorption member 112 and is reflected is completely absorbed by the second light absorption member 141. It is thus possible to reduce the influence of generated heat upon the structural parts in the vicinity of the light absorption member 112. In addition, since the locations of the production of heat are dispersed, the heat radiation effect can be improved.

Modification of Third Embodiment

Figure 7:
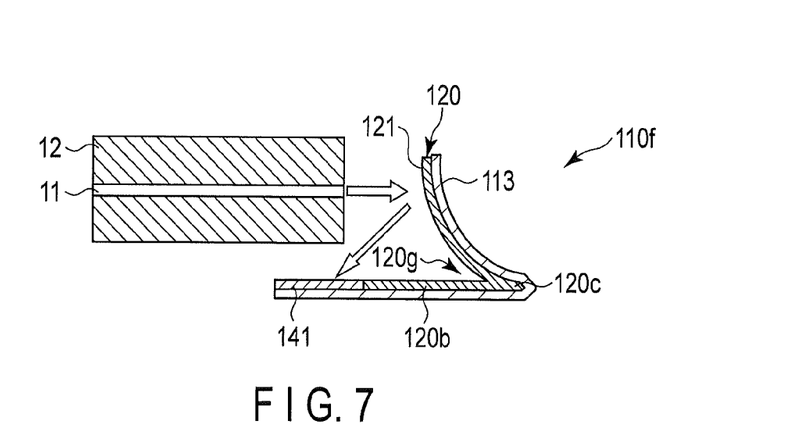
FIG. 7 is a perspective view of a light shield member of a modification of the third embodiment.

Next, referring to FIG. 7, a modification of the third embodiment is described.

Like the third embodiment, an optical connector of the modification of the third embodiment has substantially the same structure as the optical connector 1 of the first embodiment, but these are different with respect to the structure of a light shield member 110f. Accordingly, the structural elements common to those in the first embodiment are denoted by like reference numerals, and a detailed description thereof is omitted.

As illustrated in FIG. 7, a light shield member 110f includes, at least, a shutter base 120, a first light absorption member 141, and a thermal diffusion member 113.

The shutter base 120 comprises a shutter light shield member 120a, a shutter fixing member 120b, and a shutter bend portion 120c. Incidentally, the shutter light shield member 120a and shutter fixing member 120b may be separate bodies, if these are coupled and fixed by the shutter bend portion 120c.

As illustrated in FIG. 7, the light shield member 110f has substantially the same structure as the light shield member 110 of the first embodiment, but these are different with respect to the structure of the shutter base 120 and the position of disposition of the light absorption member 141. In the light shield member 110f, that range of the shutter base 120 on which light emitted from the first optical fiber 11 is radiated is mirror-finished as a reflection surface 121, thereby having a reflectance increased, and causing light which is reflected preferably by total reflection to impinge on the light absorption member 141. The light absorption member 141 is glued onto the upper surface of the thermal diffusion member 113 and is disposed to come in contact with an end portion of the shutter fixing member 120b on the proximal end side. In addition, the light absorption member 141 is disposed in a range including at least an area on which reflective light from the reflection surface of the shutter base 120 is radiated.

When light is radiated from the first optical fiber, the shutter base 120 substantially totally reflects the light to the light absorption member 141. The light absorption member 141 absorbs the total-reflected light from the shutter base 120, and conveys the generated heat directly to the thermal diffusion member 113, thereby radiating the heat.

According to the modification of this embodiment, since the light absorption member 141 is disposed on the flat surface of the thermal diffusion member 113, the attachment of the light absorption member 141 is easy. In addition, since the light absorption member 141 is directly glued onto the thermal diffusion member 113, the heat radiation effect is improved. In the meantime, the optical connector of this embodiment may be configured to include at least one electric pin and a hole for engagement with the electric pin, as in the modification of the first embodiment.

Fourth Embodiment

Figure 8:
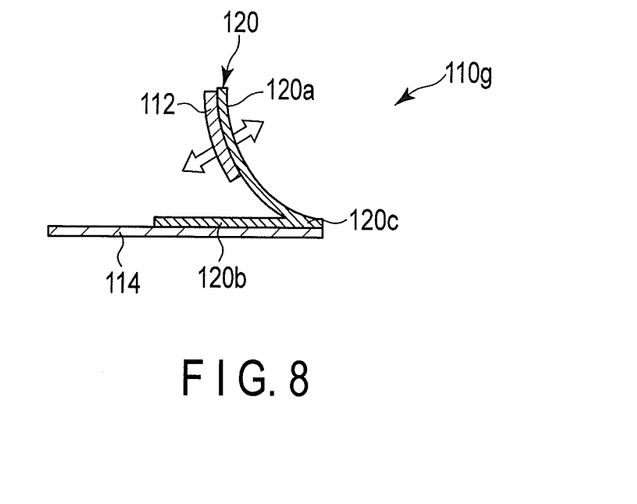
FIG. 8 is a schematic view of a light shield member of a fourth embodiment.

Next, referring to FIG. 8, a fourth embodiment is described. An optical connector of the fourth embodiment has substantially the same structure as the optical connector 1 of the first embodiment, but these are different with respect to the structure of the light shield member. Accordingly, the same structural elements as in the first embodiment are denoted by like reference numerals, and a detailed description thereof is omitted.

A light shield member 110g of this embodiment has substantially the same structure as the light shield member 110 of the first embodiment, but these are different with respect to the position of disposition of a thermal diffusion member 114.

As illustrated in FIG. 8, a light shield member 110g includes, at least, a shutter base 120, a light absorption member 112, and a thermal diffusion member 114. The shutter base 120 comprises a shutter light shield member 120a, a shutter fixing member 120b, and a shutter bend portion 120c. Incidentally, the shutter light shield member 120a and shutter fixing member 120b may be separate bodies, if these are integrally coupled by the shutter bend portion 120c. In the meantime, like the modification of the third embodiment, the light absorption member 112 may be disposed on the upper surface of the thermal diffusion member 114 by mirror-finishing that range of the shutter base 120 on which light from the first optical fiber is radiated and adjusting the angle.

The thermal diffusion member 114 is not provided on the shutter light shield member 120a, and the shutter light shield member 120a is exposed. The thermal diffusion member 114 extends from the shutter bend portion 120c through the lower part of the bottom surface of the shutter fixing member 120b, and is disposed over a wide range while extending over the inner wall of the hole of the first insulator portion 13. In addition, the thermal diffusion member 114 has an upper surface glued onto the bottom surface of the shutter fixing member 120b, and has a lower surface glued onto the inner wall of the hole of the first insulator portion 13.

In this structure, when light from the first optical fiber 11 is radiated on the light absorption member 112, the light absorption member 112 absorbs the light and conveys the generated heat to the thermal diffusion member 114 via the shutter light shield member 120a and shutter fixing member 120b. The conveyed heat is diffused and radiated by the thermal diffusion member 114.

According to this embodiment, since the thermal diffusion member 114 does not extend over the shutter bend portion 120c, the thermal diffusion member 114 is not repeatedly bent at the shutter bend portion 120c. As a result, the bending fatigue caused on the thermal diffusion member 114 is reduced, the thermal diffusion member 114 is free from a crack or wear, and the lifetime extends. In the meantime, the optical connector of this embodiment may be configured to include at least one electric pin and a hole for engagement with the electric pin, as in the modification of the first embodiment.

Fifth Embodiment

Figure 9A:
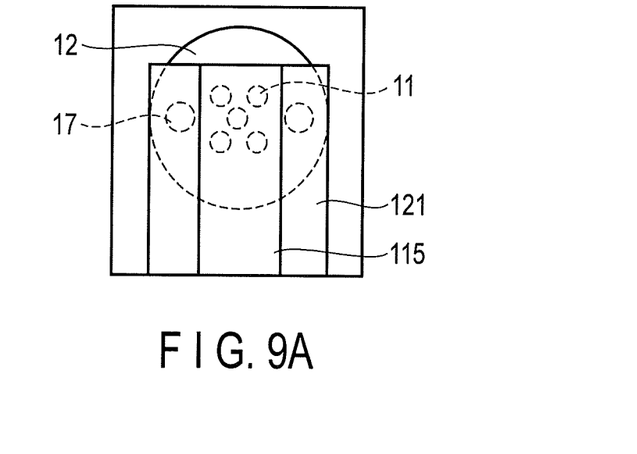
FIG. 9A is a transverse cross-sectional view of a first engaging member of a fifth embodiment.
Figure 9B:
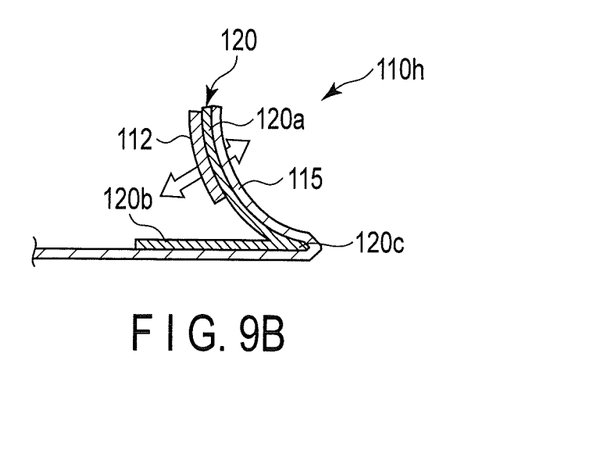
FIG. 9B is a schematic view of a light shield member of the fifth embodiment.

Next, referring to FIG. 9A and FIG. 9B, a fifth embodiment is described. An optical connector 1 of the fifth embodiment has substantially the same structure as the optical connector 1 of the first embodiment, but these are different with respect to the structure of the light shield member. Accordingly, the same structural elements as in the first embodiment are denoted by like reference numerals, and a detailed description thereof is omitted.

The structure of the fifth embodiment is described with reference to FIG. 9A and FIG. 9B.

The structure of the optical connector 1 of the fifth embodiment is substantially the same as the structure of the optical connector 1 of the first embodiment, but these are different with respect to the shape in disposition of a thermal diffusion member 115 of a light shield member 110h.

The thermal diffusion member 115 is configured such that a region thereof on the shutter light shield member 120a is narrowed in a stripe shape, so that the guide pins 27 (FIG. 1A) provided on the second insulator portion 23 may come in contact with the shutter light shield member 120a. In addition, the thermal diffusion member 115 extends from over the shutter light shield member 120a through the shutter bend portion 120c and the lower part of the bottom surface of the shutter fixing member 120b, and is glued and disposed over a wide range of the inner wall of the hole of the first insulator portion 13.

When the first and second engaging members are coupled, the guide pins 27 (FIG. 1A) abut on and push that location on the shutter light shield member 120a of the light shield member 110h on which the thermal diffusion member 115 is not disposed and from which the shutter light shield member 120a is exposed and fold the light shield member 110h.

According to the present embodiment, since the thermal diffusion member 115 is disposed at that part of the light shield member 110h on which the guide pins do not abut, it is possible to reduce damage to the thermal diffusion member 115 due to contact with the guide pins 27.

Modification of Fifth Embodiment

Figure 10A:
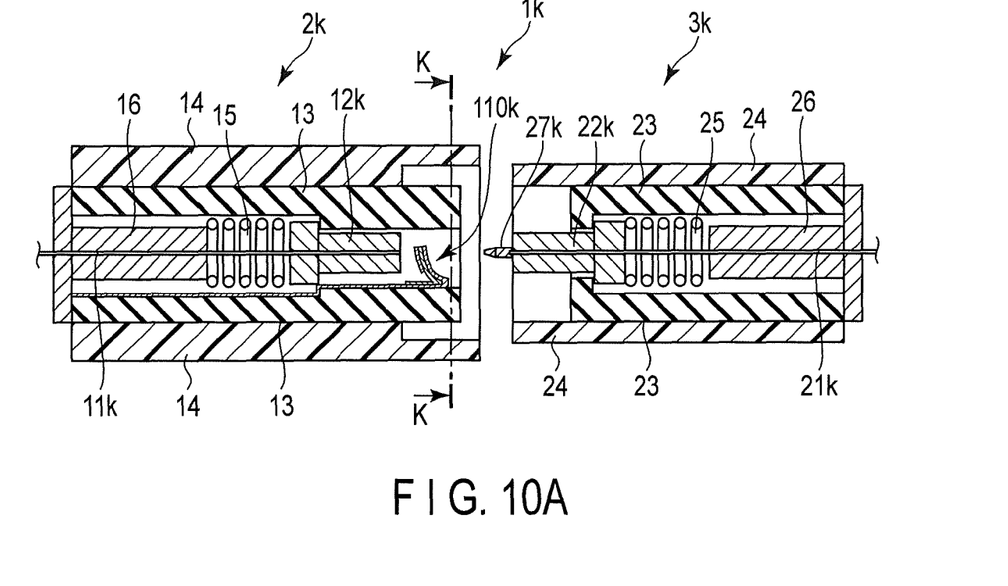
FIG. 10A is a longitudinal cross-sectional view of an optical connector of a modification of the fifth embodiment.
Figure 10B:
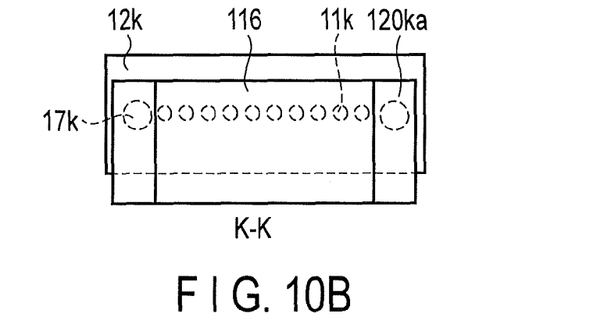
FIG. 10B is a cross-sectional view taken along a line K-K in FIG. 10A.
Figure 10C:
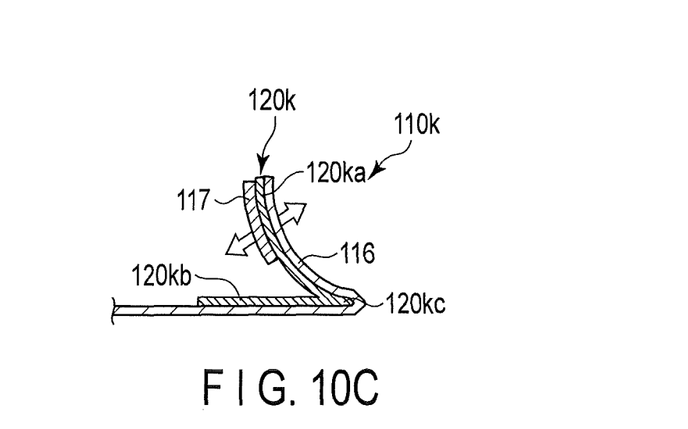
FIG. 10C is a schematic view of a light shield member of the modification of the fifth embodiment.

Next, referring to FIG. 10A to FIG. 10C, a modification of the fifth embodiment is described. An optical connector 1k of the modification of the fifth embodiment has substantially the same structure as the optical connector of the fifth embodiment, but these are different with respect to the shapes of the ferrules and the light shield member. Accordingly, the same structural elements as in the fifth embodiment are denoted by like reference numerals, and a detailed description thereof is omitted.

The structure of the modification of the fifth embodiment is described.

As illustrated in FIG. 10A and FIG. 10B, a first ferrule 12k of the modification of this embodiment includes at least one optical fiber 11k, and at least one hole 17k for alignment, which is used for alignment at a time when the adapter 2 and plug 3 are engaged.

A second ferrule 22k includes at least one optical fiber 21k, and a guide pin 27k which is an alignment member, which is engaged with the hole 17k and is used for alignment.

As illustrated in FIG. 10B, the first ferrule 12k has a rectangular prism shape at least at the emission end portion. Similarly, the second ferrule 22k has a rectangular prism shape at least at the incidence end portion. The emission end of the first ferrule and the incidence end of the second ferrule are formed to be mutually optically coupled without connection loss. The first and second optical fibers 11k, 21k are regularly arranged in a straight line in a direction perpendicular to the optical axis in the first and second ferrules 12k, 22k, respectively.

The optical connector of this embodiment includes, as the light shield member, a light shield member 110k as illustrated in FIG. 10B and FIG. 10C.

The light shield member 110k has substantially the same structure as the light shield member 110h of the fifth embodiment, but these are different in shape. As illustrated in FIG. 10B and FIG. 10C, the light shield member 110k includes a shutter base 120k and a light absorption member 117 which have surfaces blocking off the optical path of light radiated from a plurality of first optical fibers 11k, and a thermal diffusion member 11 which can sufficiently radiate heat generated by the light absorption member 117.

The shutter base 120k comprises a shutter light shield member 120ka having such an area as to shield light radiated from the plural optical fibers 11k, a shutter fixing member 120kb which fixes the light shield member 110k to the first insulator portion 13, and a shutter bend portion 120kc which is a base point of bending of the shutter base 120k. Incidentally, the shutter light shield member 120ka and shutter fixing member 120kb may be separate bodies, if these are coupled by the shutter bend portion 120kc.

The thermal diffusion member 116 has substantially the same structure as the thermal diffusion member 115 of the fifth embodiment, but these are different with respect to the width for light shielding. The thermal diffusion member 116 is disposed to have such a width that light radiated from the plural optical fibers ilk is shielded, and the guide pins 27k do not come in contact with the thermal diffusion member 116. In addition, the thermal diffusion member 116 has at least such an area that the heat generated by the light absorption member 117 can sufficiently be diffused. For example, the thermal diffusion member 116 extends from the back surface (non-light-radiation surface) of the shutter light shield member 120ka through the lower part of the bottom surface of the shutter fixing member 120kb, and is disposed over a wide range of the inner wall of the hole of the first insulator portion 13.

In the state at a time when the adapter 2k is not coupled, light is radiated from the first optical fibers 11k and the light is shielded by the light shield member 110k. The light shield member 110k shields light from the plural optical fibers 11k, and the generated heat is directly conveyed to the thermal diffusion member 116 and is radiated. In addition, when the first and second optical fibers 11k, 21k are optically coupled, the guide pins 27k push those portions of the shutter light shield member 120ka, on which the thermal diffusion member 116 is not disposed, and evacuate them from the optical path, and engage with the holes 17k.

According to this embodiment, since the plural first and second optical fibers 11k, 21k are arranged in a straight line, the concentration of light can be dispersed. Accordingly, local overheat can be reduced. In addition, since the optical fibers are distributed over a wide range, the shutter light shield member 120ka is similarly formed over a wide range. Accordingly, since the heat radiation area of the thermal diffusion member 116 with a large width increases, the heat radiation effect can be improved. Furthermore, since the thermal diffusion member 116 is provided with such a width of the light shield member 110k that the guide pins do not come in contact, it is possible to reduce damage to the thermal diffusion member 116 due to contact with the guide pins 27. In the meantime, in the present embodiment and the modification, each light shield member 110h, 110k may have substantially the same structure as the light shield member of each of the first and fourth embodiments and their modifications, if the guide pins 27, 27k do not come in contact with the thermal diffusion member 115, 116. Incidentally, the optical connector of this embodiment may be configured to include at least one electric pin and a hole for engagement with the electric pin, as in the modification of the first embodiment.

Sixth Embodiment

Figure 11:
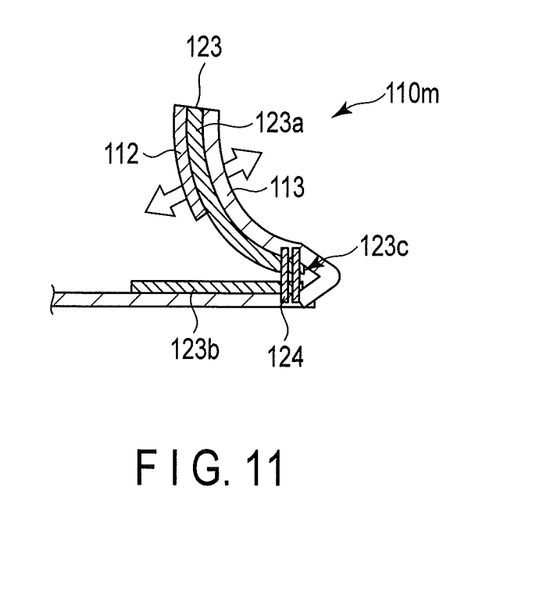
FIG. 11 is a schematic view of a light shield member of a sixth embodiment.

Next, referring to FIG. 11, a sixth embodiment is described. An optical connector of the sixth embodiment has substantially the same structure as the optical connector 1 of the first embodiment, but these are different in that a shutter base 123 includes a coupling member 124. Accordingly, the same structural elements common to those in the first embodiment are denoted by like reference numerals, and a detailed description thereof is omitted.

An optical connector 1 of this embodiment includes, as the light shield member, a light shield member 110m as illustrated in FIG. 11. The light shield member 110m has substantially the same structure as the light shield member 110 of the first embodiment, but these are different with respect to the structure of the shutter base 123.

As illustrated in FIG. 11, the light shield member 110m comprises a shutter light shield member 123a, a shutter fixing member 123b, a shutter bend portion 123c, and the coupling member 124. In the light shield member 110m of this embodiment, the shutter light shield member 123a and shutter fixing member 123b, which are different members, are coupled with a gap by the coupling member 124. By this gap being provided, the shutter light shield member 123a and shutter fixing member 123b are foldably coupled. This coupling member 124 can be realized by fitting and fixing, for example, a screw or a bar member for a joint. Alternatively, an adhesive, a tape, etc. may be used. Incidentally, the shutter fixing member 123b may adopt such a structure as to increase an urging force for restoration at a time of disengagement, in combination with the coupling member 124, a torsion coil spring, etc.

According to the present embodiment, by using the coupling member 124, it is allowed to use the shutter light shield member 123a and shutter fixing member 123b which are different members formed of different materials. In addition, the shutter light shield member 123a and shutter fixing member 123b can easily be replaced by detaching the coupling member 124m, when maintenance has become necessary because of time-dependent variation or degradation due to use. In the meantime, the optical connector of this embodiment may be configured to include at least one electric pin and a hole for engagement with the electric pin, as in the modification of the first embodiment. Besides, in the above-described embodiments, the light shield member may not be configured such that the light shield member is stored by being folded by pushing and is restored by the resiliency of the shutter bend portion 123c.

Incidentally, the above-described embodiments add no limitations to the materials and shapes of the optical connector and the structural elements of the optical connector, and the structure of the light shield member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical connector comprising:
a first engaging member holding at least one first optical fiber to guide light from a light source;
a second engaging member holding a second optical fiber to be optically connected to the first optical fiber, and configured to be engaged with the first engaging member; and
a light shield member provided in a vicinity of an emission end of the first optical fiber of the first engaging member, at such a position as to shield radiation light emitted from the first optical fiber toward an outside at a time of disengagement of the first and second engaging members, the light shield member being pushed by the second engaging member at a time of engagement of the first and second engaging members, so as to be folded and evacuated in a gap provided in advance from an optical path of the radiation light,
the light shield member including a light absorption member configured to receive and absorb the radiation light and to generate heat, a thermal diffusion member configured to diffuse and radiate the heat generated by the light absorption member, and a base supporting the light absorption member and the thermal diffusion member.

2. The optical connector according to claim 1, wherein the light absorption member is formed in a sheet shape and is glued at least onto a surface of the light shield member on which the radiation light impinges.

3. The optical connector according to claim 1, wherein the light shield member comprise a fixing member and a curved member disposed on the optical path of the radiation light, the fixing member and the curved member are coupled in a curved fashion and formed in a substantially L shape, the curved member is pushed and folded at a time of engagement, and the curved member is restored in shape by resiliency at a time of disengagement.

4. The optical connector according to claim 1, wherein the thermal diffusion member has a sheet shape and is disposed within the first engaging member.

5. The optical connector according to claim 1, wherein the first and second engaging members each have a multi-core structure including a plurality of first and second optical fibers.

6. The optical connector according to claim 3, wherein the light shield member is separable into the curved member and the fixing member, and includes a coupling member configured to connect the curved member and the fixing member at a bend portion.

7. The optical connector according to claim 2, wherein the light shield member is formed such that the light absorption member and the thermal diffusion member are put in direct contact.

8. The optical connector according to claim 2, wherein the light shield member includes a first light absorption member disposed on a surface on which the radiation light impinges, and configured to absorb part of the radiation light and to reflect the radiation light that has not been absorbed in a desired direction, and a second light absorption member disposed on a surface on which the reflected light impinges and configured to receive and absorb the reflected light.

9. The optical connector according to claim 2, wherein the light shield member has a mirror surface configured to reflect the radiation light in a desired direction, and includes the light absorption member on a surface on which the reflected light impinges.

10. The optical connector according to claim 3, wherein the thermal diffusion member is disposed over an inner wall of the first engaging member from the light shield member so as not to extend on the curved member.

11. The optical connector according to claim 3, wherein, in order to perform alignment of optical coupling between the first optical fiber and the second optical fiber, the second engaging member includes an alignment member for engagement that is disposed in a vicinity of an incidence end of the second engaging member, and the first engaging member includes an alignment hole for engagement with the alignment member, and the thermal diffusion member is disposed so as not to abut the alignment member on a non-light-radiation surface of the light shield member.

* * * * *